May 25, 1937.  G. E. HOWARD  2,081,857
METHOD OF AND APPARATUS FOR FORMING HOLLOW GLASS ARTICLES
Filed April 24, 1934   5 Sheets-Sheet 1

May 25, 1937.  G. E. HOWARD  2,081,857

METHOD OF AND APPARATUS FOR FORMING HOLLOW GLASS ARTICLES

Filed April 24, 1934  5 Sheets-Sheet 3

Witness:
W. B. Thayer

Inventor:
George E. Howard
by Brown & Parham
Attorneys

Patented May 25, 1937

2,081,857

UNITED STATES PATENT OFFICE 2,081,857

METHOD OF AND APPARATUS FOR FORMING HOLLOW GLASS ARTICLES

George E. Howard, Butler, Pa., assignor to Hartford-Empire Company, Hartford, Conn., a corporation of Delaware Application April 24, 1934, Serial No. 722,134

18 Claims. (Cl. 49—9)

This invention relates to a method of and apparaus for forming hollow glass articles, and more particularly to a method and apparatus similar in some respects to and in so far as it is common, a continuation in part of the method and apparatus of my copending application, Serial No. 716,634, filed March 21, 1934.

The present invention preferably embodies the principle of forming hollow glass articles in a blank mold and a blow mold in combination with which there is provision for suspending and/or otherwise supporting the blanks formed in the blank mold at some intermediate position or zone out of contact and out of registry with either the blank or blow molds. By "out of registry" is meant any position which a blank may occupy, be it moving or stationary, in which the molds, if closed, would not close around the blank. Thus, for example, a position above and in vertical alignment with a blow mold or a blank mold would be considered an "out of registry" position with respect to such mold. By thus supporting a blank in an out of registry position with respect to a mold, it is contemplated that the mold is free for use upon some other article of glass and/or for movement incident to forming some other article of glass.

Among the general objects of the present invention is to provide a method and an apparatus of the character set forth above and in my prior and copending application above referred to for making hollow glass articles efficiently in a blank mold and a blow mold with an intermediate reheating period provided during which blanks may be reheated to a substantial extent, thus freeing the molds for use for other purposes during this reheating period.

A further object of the present invention is to provide a method and apparatus of the character above set forth wherein provision is made for carrying out the various steps of the process and operating the various instrumentalities of the apparatus in an overlapping time relationship.

A further object of the present invention is to provide a method for the continuous production of glassware particularly by forming glass articles during continuous movements of the glass being formed and to provide apparatus comprising a continuous machine for carrying out the method as above outlined.

A further object of the present invention is to provide a method of and means for controlling the elongation of glass blanks during reheating in open air and/or after the blanks have been transferred to the blow molds.

A further object of the present invention is to provide for the supporting of the glass blanks for reheating in an out of registry position with respect to any mold, as above set forth, and while moving the blanks in a substantially circular path or portion of a path and in which special provisions are made for compensating for the distorting effect of centrifugal force incident to such movement.

A further specific object of the present invention is to provide for the elongation and expansion of glass blanks in a blow mold in a peculiar and novel manner including a mechanical limiting of the rate of elongation of the blanks and/or the gradual expansion and elongation of the blanks by supplying to the interior thereof while in the blow mold a fluid at a relatively low pressure followed by the blowing of the blanks to the final form of the blow mold by the admission into the interior thereof of a fluid at a relatively high pressure.

Other and more specific objects of the present invention will become apparent from a reading of the following description and appended claims when taken in connection with the accompanying drawings, in which:

For the purpose of illustrating my present invention, I have shown one embodiment thereof comprising a two-table continuously rotating machine, although it will be understood that certain of the principles of my invention are not limited to this type of machine, but may be separately employed in other types of machines, such for example as single turret machines and/or intermittently rotating machines.

*The mold carriers, their mounting, construction and rotating means*

Figures 2, 6:
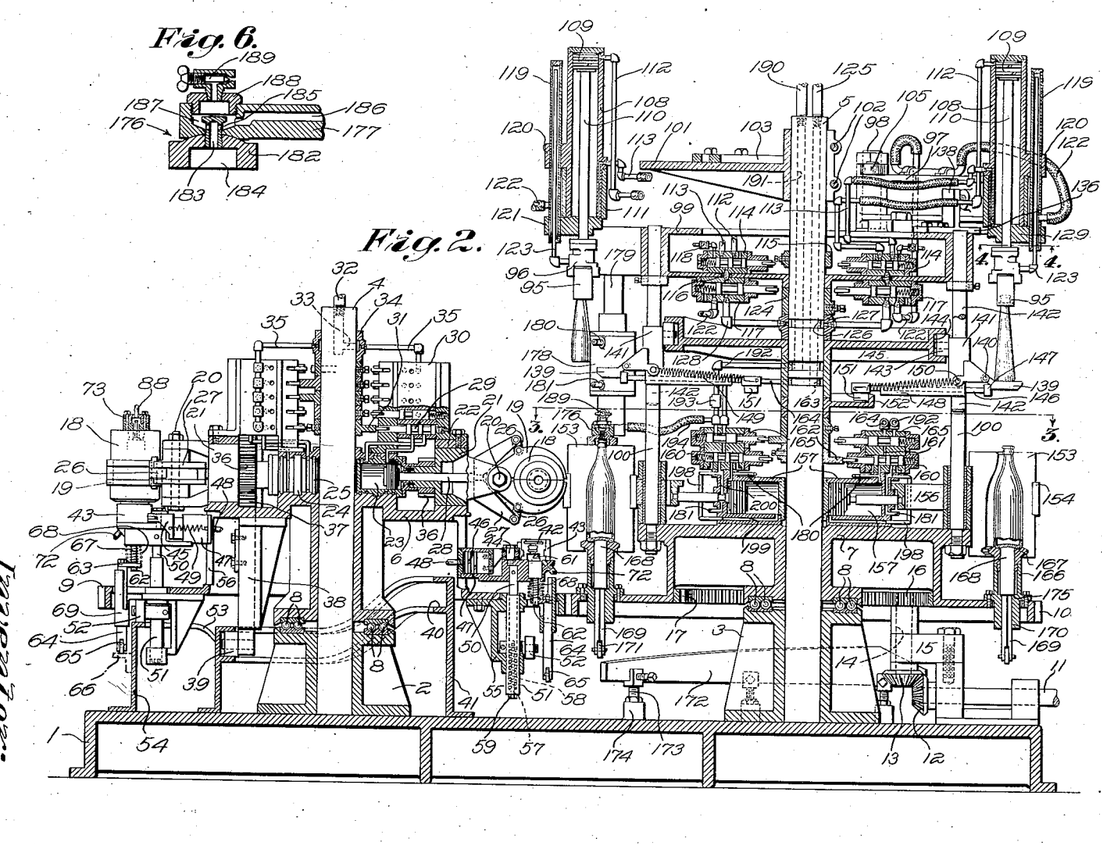
Fig. 2 is a view substantially in vertical section on the line 2—2 of Fig. 1, showing the entire machine.
Fig. 6 is a detail view in vertical section showing the final blow head and certain associated means.

Referring first to Fig. 2, there is illustrated a machine mounted upon a base 1, this base having secured thereto suitable stationary supporting means 2 and 3 in which are mounted respectively stationary columns 4 and 5. The base 2 and column 4 carry the rotatable blank mold carrier 6 and the base 3 and column 5 carry the rotatable blow mold carrier 7 there being preferably interposed between these carriers and their respective bases suitable ball bearings or other anti-friction devices as indicated at 8.

The blank mold carrier 6 and blow mold carrier 7 are respectively provided with intermeshing large ring gears 9 and 10, so that rotation imparted to one will be correspondingly imparted to the other and the carriers will be thus rotated in synchronism each with the other.

Means are provided for rotating the blank and blow mold carriers from any suitable source of power (not shown), which is adapted to rotate the drive shaft 11 (Fig. 2) continuously. Suitable means (not shown) may be provided for clutching and declutching the prime mover used from the shaft 11 and/or breaking the driving connection at some point should the machine encounter an overload which might cause damage thereto. As illustrated, the shaft 11 is journaled in a bracket secured to the base 1 and carries at its inner end a bevel gear 12 meshing with the bevel gear 13 secured to the lower end of a short vertical shaft 14, which is journaled in a bracket 15 secured to the base 1. At its upper end, the shaft 14 carries a pinion 16 meshing with the inwardly directed gear teeth of a ring gear 17, this ring gear being suitably secured to the blow mold carrier 7, as illustrated.

*The blank molds, their mounting and operating means*

I have shown in the accompanying drawings a machine including four similar blank molds 18 mounted upon the blank mold carrier 6, although it is contemplated that any desired number of molds may be employed. As all the blank molds are similar, a description of one will suffice for all. The mold 18 is of the split variety now in common use and may be interchangeably supported in suitable mold holders 19 in any conventional manner, these mold holders being pivoted upon a pintle 20 which is received in suitable ears supported by an invertible head 21. The head 21 has a cylindrical outer surface and is received within a suitable bearing portion which may be formed partly in the main structural member of the blank mold carrier 6 and partly in a cap-like member 22 rigidly secured to the blank mold carrier 6, so as to permit of the easy assembly of the parts as will be apparent hereinafter. To the inner end of the head 21 is secured a pneumatic cylinder 23, shown best in Fig. 2, this cylinder being formed with a pair of circumferential flanges 24 and 25 received in complementary grooves in an inner bearing portion for the cylinder as illustrated. These flanges and grooves serve to prevent any radial movement of the head 21 and its associated mechanism. The bearing for the cylinder 23 may be constructed in substantially the same way as the bearing for the head 21, so as to permit of the easy assembly of the parts.

For opening and closing the blank mold when desired, the mold holders 19 are connected by short links 26 to the outer end of a V-shaped yoke 27, which is secured to the piston rod 28 of the pneumatic cylinder 23. Thus upon movement of the piston in that cylinder to the right as seen in the sectional view at the right of the column 4 in Fig. 2, the yoke 27 will be moved radially outward of the blank mold carrier, closing the mold 18 as shown. Upon movement of this piston to the left as seen in the sectional showing in Fig. 2, the yoke 27 will be moved radially inward of the blank mold carrier and the blank mold opened.

The configuration of the yoke and the angle assumed by the links 26 provides a substantially toggle connection for insuring the complete closing and a sufficient locking of the blank mold.

Breakage of the parts is prevented by the use of pneumatic means for opening and closing the blank mold, such means being yieldable in the event that some obstruction presents itself in the way of fully closing the mold.

Pressure may be conducted to the opposite ends of the cylinder 23 as illustrated from a suitable valve generally indicated at 29 and preferably formed as one of a bank of valves located in a valve block 30 mounted above the member 22 for each of the units, that is for each of the blank molds. There are, as shown, five valves in this block although any suitable number may be employed as may be necessary. These valves are each controlled by individually adjustable and interchangeable stationary cams, the lowermost of which for controlling valves 29 is indicated at 31, the several cams being all mounted on the stationary column 4. Pressure from any suitable source may be supplied through the pipe 32 to a bore axially of the column 4 and thence may pass through a lateral bore 33 to an annular chamber within a collar member 34 rotatable with the turret and communicating through pipes 35 with all the valves of each valve block 30. Inasmuch as the construction of the several valves is or may be conventional in character, no particular description thereof will be given. The particular construction and operation of the lowermost valve 29 associated with the cylinder 23 will be obvious from the drawings. The blank molds may be opened or closed in any inverted, reverted or intermediate position in response to the rotation of the blank mold carrier, as the passages for pressure from the valve 29 communicate with annular chambers formed by grooves cut in the external walls of the cylinder 23 as illustrated.

Means are provided for inverting each of the blank molds when desired, such means comprising a pinion 36 suitably secured to the invertible head 21 and meshing with a vertically movable rack 37 carried by the blank mold carrier 6 and guided by a suitable guide as 38 rigid with the blank mold carrier. At their lower ends the racks 37 carry cam rollers 39 adapted to ride in a closed cam slot 40 formed in a substantially cylindrical member 41 secured in a stationary position upon the base 1 in any desired manner. The stems of the racks 37 are constructed either square or in any non-circular contour and/or may be provided with a suitable spline in order to prevent the rotation thereof with respect to the guides 38 and in order that the roller 39 will always be presented in the desired relation to the cam slot 40. The inversion and reversion of the blank molds is thus made subject to the rotation of the blank mold carrier.

*Neck forming and mouth forming, means, construction and operation*

In the machine illustrated in the accompanying drawings, there is provided in combination with each invertible blank mold above described a non-invertible neck ring and neck pin, so that after a blank has been formed in the blank mold and neck ring, the neck ring may be opened and removed from about the neck of the blank, the blank mold may then be reverted to bring the neck portion of the blank uppermost. While in some instances it may be necessary that the neck ring merely be opened sufficiently in order to permit the reversion of the blank mold, there is preferably provided in addition to the opening and closing movement of the neck ring, a vertical movement thereof, so that the neck ring may be opened and then moved vertically downwardly out of its position in cooperation with the blank mold so as to leave such mold free of any possible interference at the time it is reverted to a neck-up position. This subject matter is not my invention and hence is not claimed herein. The construction is one which may be used, however, if desired, or alternatively the usual arrangement of a neck ring invertible with the blank mold may be used, this latter arrangement being well known in the art.

As shown, each neck ring 42 may be formed in suitable halves or mating portions in the usual manner, these halves being received in neck ring holders 43 which are pivoted upon a common pintle 44, as is customary in the art. The holders 43 may be connected in a manner not clearly shown in the drawings, but preferably similar to the manner in which the blank mold holders 19 are connected to the yoke 27, to a yoke member 45, which is preferably formed integral with a piston 46 slidable in a pneumatic cylinder 47. Pressure may be conducted to the inner end of the cylinder 47 through a pipe 48 from one of the valves in the valve block 30 for moving the piston 46 radially outward of the blank mold carrier 6 and thereby for closing the neck ring 42. Return movement of the piston 46 in the cylinder 47 may be accomplished by a pair of tension springs 49 arranged as illustrated at the left in Fig. 2 between suitable anchorages on the cylinder 47 and pin connections on the yoke or head 45, one of these springs being preferably arranged on each side of the cylinder 47.

The entire assembly of the neck ring and its opening and closing means may be mounted for vertical movement on the upper end of a vertical shaft 50 which is telescopically received within a hollow sleeve member 51, the latter carrying a cam roller 52 cooperating with a cam surface 53 formed on the upper edge of a semi-annular member 54 secured to the base 1. The sleeve member 51 is suitably journaled in bearings in a bracket 55 secured to a portion of the continuously rotating blank mold carrier 6. The depending web of the blank mold carrier 6 which supports the bracket 55 is provided with a slot 56 just wide enough to clear and thus to guide the inwardly extending end of the cylinder 47, thus preventing rotation of the neck ring and its associated parts about the axis of the shaft 50 and the sleeve 51. The lower end of the shaft 50 carries an axially extending slender bolt 57 which passes through a small hole in the lower end of the sleeve member 51. The lower end of the sleeve member surrounding the hole supports the lower end of a compression spring 58 extending between this end and the lower end of the shaft 50 and surrounding the bolt 57. The bolt 57 is formed below the end of the sleeve member 51 with a head 59, so that upon upward movement of the roller 52 and of the sleeve member 51 as a result of the roller 52 riding up an incline of the cam surface 53, the neck ring and its associated structure will be resiliently moved upward by a force measured by the compression of the spring 58. On the other hand, the shaft 50 and sleeve 51 are prevented from excessive movement apart under the compressive action of the spring 58 by the head 59 on the end of the bolt 57 which is secured in the end of the shaft 50.

The lowermost position of the neck ring assembly is determined by the collar which carries the roller 52 and is secured to the sleeve member 51 seating upon the upper side of the lower bearing for the sleeve 51 in the bracket 55 as shown. The upper limit of movement of the neck ring structure is determined by the neck ring seating against the lower surface of the blank mold.

Figures 8, 9:
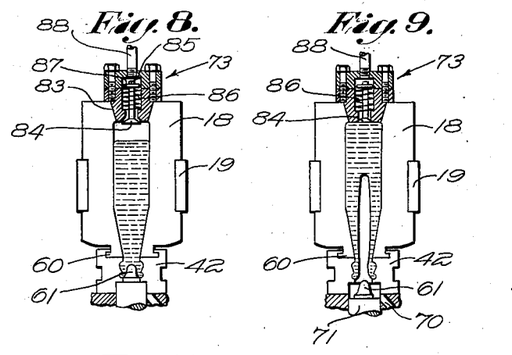
Figs. 8 to 15 inclusive are diagrammatic views illustrating the various steps in the production of a completed hollow glass article.

As shown, the neck ring is provided with an undercut recessed portion, best illustrated at 60 in Figs. 8 and 9, adapted to embrace a downward extension and flange of the blank mold so as to properly align the neck ring and the blank mold during their cooperation with one another.

Arranged in cooperation with the neck ring, as in the usual case, is a neck pin 61 which is preferably removably and interchangeably mounted on the upper end of a stud 62 projecting freely through a lateral extension or bracket 63 mounted upon the upper end of a stem 64, which carries at its lower end a roller 65 for cooperation with the cam indicated diagrammatically in dotted lines at 66 at the left in Fig. 2. Interposed between the upper surface of the brackets 63 and the underside of the head immediately carrying the neck pin 61 is a light compression spring 67, the inside spring as illustrated in the accompanying drawings. This spring tends to move the neck pin upwardly with respect to the neck ring and is the measure of the force exerted on the neck pin in holding it in cooperative relation with the glass during settle blowing, as illustrated particularly in Fig. 8. Surrounding the stem 62 and outside the spring 67 is a larger spring 68 which extends between the bracket member 63 and the underside of the head carrying the neck ring structure and the cylinder 47. This spring 68 serves to move the bracket member 63 and rod 64 downwardly with respect to the neck ring carrying structure whenever this action is permitted by the configuration of the cam 66 and serves to supply the force to depress the neck pin from the position of Fig. 8 to the position of Fig. 9 after the compression on the spring 67 is relieved and while the neck ring remains in position locked with respect to the blank mold by the construction illustrated at 60, Fig. 9. The shaft 64 is received within a suitable guide sleeve 69 which is carried by the bracket 55 and may be integral therewith. Suitable means (not shown) may be provided if desired for preventing rotation of the shaft 64 with respect to the guide sleeve 69, such means, if used, being conventional in character.

At the lowermost position of the neck pin with respect to the neck ring, that is the position of these parts shown in Fig. 9, a counterblowing port 70 is uncovered by downward movement of the head 71 by which the neck pin 61 is directly carried. This port 70 communicates through a pipe indicated at 72 (Fig. 2) with one of the valves in the valve block 30, so that counterblowing pressure may be supplied when desired to the interior of the blank to blow it to the form shown in Fig. 9.

Thus the neck pin may be moved vertically with the neck ring structure while at the same time provision is made for independently moving the neck pin with respect to the neck ring in both directions, these two operations being accomplished by the cam surface 53 and the cam 66 respectively.

The settle blow head and counterblow baffle

Figures 3, 4, 5:
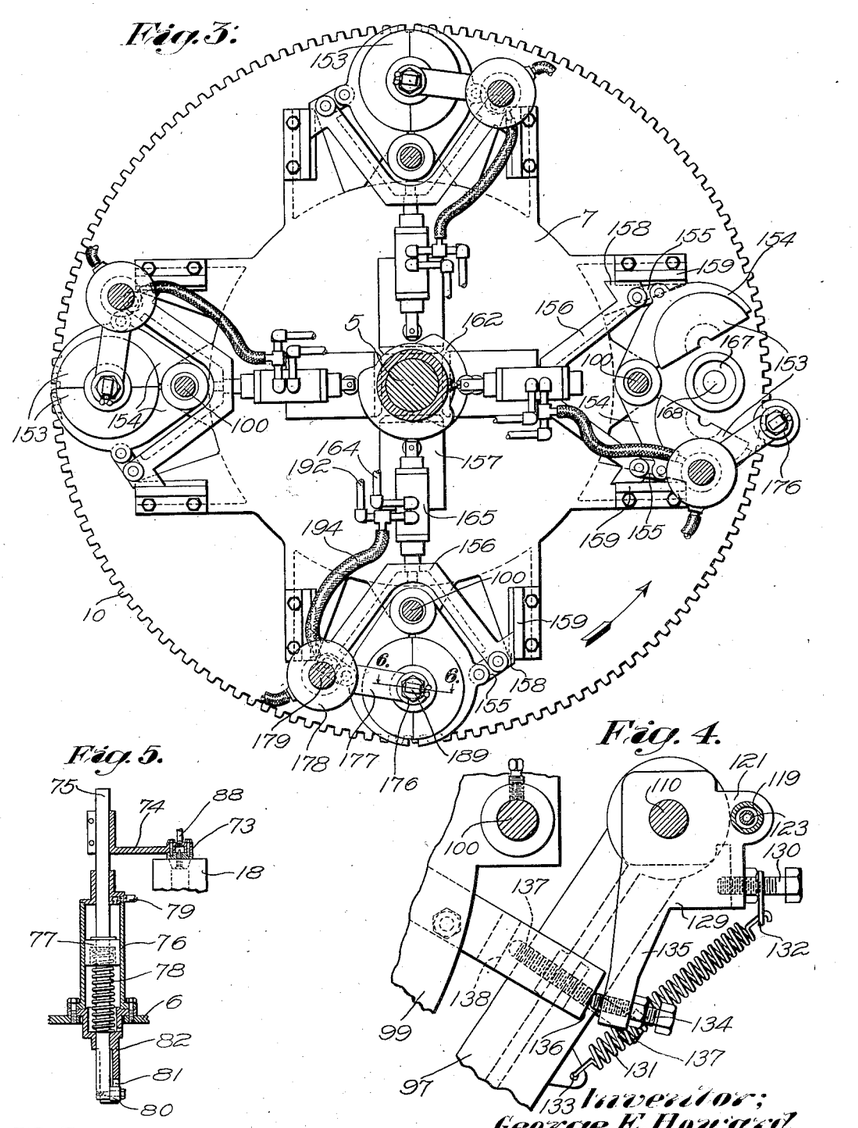
Fig. 3 is a view partly in plan and partly in horizontal section on the line 3—3 of Fig. 2, showing the blow mold carrier and certain of the final blow molds and their operating means.
Fig. 4 is a view partly in inverted plan and partly in horizontal section on the line 4—4 of Fig. 2, showing the means for partially rotating the tongs mechanism for positioning blanks in the blow mold.
Fig. 5 is a fragmentary view principally in vertical section showing the combined settle blow head and counterblow baffle used in conjunction with the blank molds.

For the purpose of supplying settle blowing pressure to the blank mold 18 and also for serving as a baffle for the glass in counterblowing, I have provided a substantially unitary structure somewhat diagrammatically shown at 73 in Figs. 2 and 5 and shown in detail in Figs. 8 and 9. This head serves both purposes.

The head 73 is mounted upon a laterally extending arm 74 secured to the upper end of a shaft 75, which comprises the piston rod of a pneumatic cylinder 76 secured to the blank mold carrier 6, as illustrated, or in any other desired manner. The shaft 75 carries within the cylinder 76 a piston 77, which is separated from the lower head of the cylinder by a compression spring 78 serving to move the piston upwardly when such action is permitted by the exhausting of pressure above the piston 77. Pressure may be supplied to and exhausted from the cylinder 76 through a pipe 79 from one of the valves in the valve block 30. The rod 75 also extends through the lower head of the cylinder 76. This lower extension carries a cam roller 80 cooperating with a curved slot 81 formed in a semi-cylindrical extension 82 secured to the lower head of the cylinder 76. The construction shown is the usual twist cam arrangement providing a substantially helical movement for the head 73 when away from the upper end of the mold 18 with a vertical movement for the head 73 as it approaches and comes into engagement with the mold.

The details of the head 73 per se are best illustrated in Figs. 8 and 9 in which the head is shown as having a bevelled outer surface 83 cooperating with a complementary bevel formed in the upper end of the blank mold 18. The head 73 may be provided with a poppet-type valve head 84 seating in a complementary beveled aperture in the head, the valve 84 being carried by a stem 85 about which is arranged a compression spring 86 extending between a shoulder in the head 73 and a suitable stop, as a washer 87, secured to the stem 85 of the valve 84.

Pressure may be conducted to the head 73 through a suitable pressure pipe 88 from one of the valves of the valve block 30 as and when desired. When pressure is supplied through the pipe 88 for settle blowing a charge of glass, as illustrated in Fig. 8, the pressure will unseat the valve 84 and pass into the mold to settle blow the charge. When, on the other hand, pressure is cut off, as during counterblowing, the valve 84 will be seated by compression of the spring 86, as shown in Fig. 9, so as completely to close the lower end of the head 73, so that the lower surface of the head 73 and that of the valve 84 together form a baffle plate to limit the expansion of the glass during counterblowing.

Transfer means, mounting and operation

In the method of operation which I prefer to employ, the blanks being completed in the blank molds and those molds being reverted as above set forth to bring the blanks to a neck-up position, are engaged by the transfer means, which in the present instance comprise tongs. These transfer means are mounted on and movable with the blow mold carrier 7 and are so arranged that the tongs will substantially follow the path of the blank molds for a predetermined period, during which the blanks may be removed therefrom. The path of the tongs is illustrated best in Fig. 7 by the dot and dash line 89, this path including a portion 90 substantially concentric with the path of the blank molds and in alignment therewith. The blanks are then moved into a portion of the path substantially concentric with the axis of the blow mold carrier 7, this portion beginning substantially at the point 91 and continuing substantially to the point 92 except as hereinafter to be noted. At about the point 93, the tongs are moved outwardly from that portion of the path at a radius somewhat less than that of the blow molds to a portion of the path at the radius of the blow molds, this portion being indicated at 94. The movement of the tongs at the point 93 is for the purpose of exerting on the upper end of the blanks a force tending to counteract the influence of centrifugal force thereon during the travel about the axis of the blow mold carrier, so that at the time the blanks are placed within the blow molds, they will be free of any influence tending to distort them in a lateral direction, which might result in uneven distribution of the type known in the art as "heel taps".

For the purpose of carrying out these various movements of and for transferring the blanks from the blank molds to the blow molds, I preferably provide a transfer means individual to each of the blow molds, that is, on a machine as illustrated in the accompanying drawings there will be four such transfer means. Each of these means comprises tongs 95, Figs. 2, 10 and 11, which are mounted in any conventional manner to a tongs operating mechanism 96 which may be of the type providing for the closing of the tongs by a suitable spring (not shown) and the opening thereof by the admission of air pressure to a cylinder on one side of a piston therein, the piston being suitably connected with the tongs for this purpose. Such a tongs mechanism is shown for example in the patent to Lorenz 1,878,-156, granted Sept. 20, 1932, (see particularly Fig. 7 thereof). It will be understood of course that certain changes in proportion may have to be made in adapting the Lorenz type of mechanism to the construction herein shown, but this general type of tongs is adaptable for this purpose. Any other desired type of tongs and operating mechanism which might be used are to be considered within the purview of this invention.

The tongs are carried, in a manner to be hereinafter set forth, on the ends of horizontal extending arms 97 mounted on vertical pivots 98 on the upper member 99 of the blow mold carrier, this member being suitably secured to the lower member thereof by a plurality of vertical columns 100 extending therebetween, as illustrated in Fig. 2.

Figure 7:
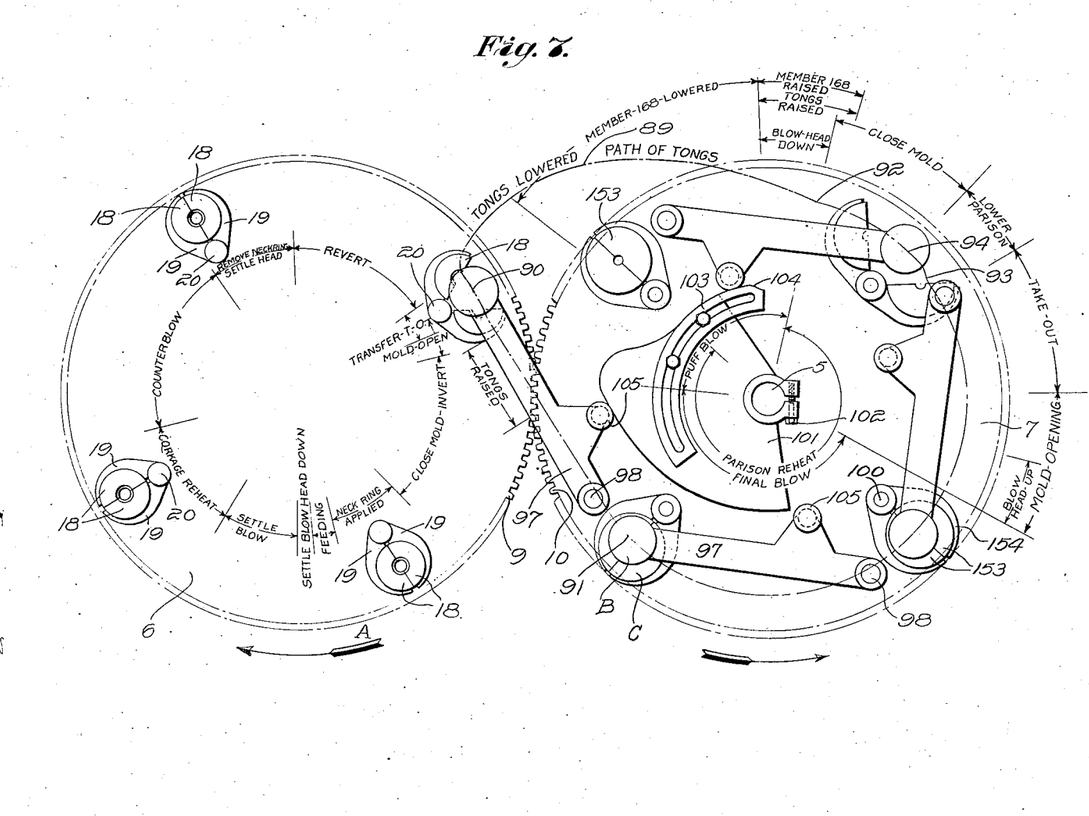
Fig. 7 is a diagrammatic view substantially in plan illustrating the transfer tongs mechanism and their path and manner of operation.

Means are provided for moving the arms 97 about their pivots 98, comprising a cam 101 suitably secured to the stationary column 5 as by clamping screws 102 and preferably provided also with an adjustable cam portion 103 serving as an extension of the effective surface of the cam 101. This cam portion 103 has a jog 104 thereon to provide the movement for the tong arms illustrated in Fig. 7 at 93. The horizontal movements of the path of the tongs shown in Fig. 7 are produced by the configuration of the cams 101 and 103. Cooperating with the cams are rollers 105 mounted on each of the arms 97, the rollers being held against the cam by tension springs 106 extending between suitable points on the arms and anchorages 107 fixed to the member 99.

Means are provided for moving the tongs vertically, such means each comprising a pneumatic cylinder 108 having a piston 109 therein, the piston rod 110 of which carries the tongs-operating mechanism 96 at its lower end. This cylinder is mounted on the arm 97 for rotative movement above the axis of the cylinder, as will be hereinafter set forth. For this purpose, the cylinder is received or journaled within an annular band 111 integral or rigid with the outer end of the arm 97. Pressure may be conducted to the opposite ends of the cylinder 108 through pipes 112 and 113 having flexible portions therein, as illustrated. The pipes 112 and 113 communicate with a valve 114 secured to the lower web of the member 99 as shown in Fig. 2 and adapted to be operated by a stationary cam 115 secured to the center column 5. The operation of the valve is believed to be obvious from the drawings, pressure being continuously supplied centrally thereto through the pipe 116 from the central chamber of the lower valve 117 and being alternately admitted to one end or the other of the cylinder 108 to move the piston therein up or down, as may be desired, the end not being supplied with pressure being exhausted to the atmosphere through the valve 114. The lowering movement of the piston within the cylinder 108 may be controlled by throttling the exhaust from the lower end of the cylinder through a throttling valve, as illustrated at 118. Inasmuch as these valves are or may be substantially conventional in character, no further description thereof will be given.

Substantially parallel with the cylinder 108 and arranged for movement therewith about the axis of that cylinder is a sleeve member 119 closed at its upper end, as shown, and supported in brackets 120 and 121 extending from the cylinder 118. Pressure may be supplied to the interior of this sleeve member through the pipe 122 from the lower valve 117, as shown at the right in Fig. 2. Extending through a suitable packing in the lower end of the sleeve member 119 is a pipe 123 which is movable vertically with the tongs and open at its upper end to the interior of the sleeve member 119 and communicates with the tongs-operating mechanism 96. Thus when the movable valve member of valve 117 is moved radially outward of the blow mold carrier by its operating cam 124 which is secured to the center column 5, pressure will be conducted from this valve through the pipe 122, the sleeve member 119 and the pipe 123 to the tongs-operating mechanism 96 to open the tongs.

High pressure air for accomplishing these several purposes is conducted to the center column 5 through the pipe 125 from any suitable source and thence passes through a longitudinal bore in column 5 and a lateral port 126 to an annular chamber formed in a collar 127 rotating with the blow mold carrier 7. From this annular chamber, pressure may flow through pipes 128 to the valves 117 and may be admitted when desired to open the tongs associated with these valves. Pressure also flows through these valves 117 and through the pipes 116 to the associated valves 114 and may be admitted therefrom to the opposite ends of the cylinders 118 when desired.

As above set forth, the cylinder 108 and associated mechanism including the tongs 95 are mounted for rotation with respect to their carrying arms 97 about the vertical axis of the cylinder. I provide means for effecting a desired rotation of each cylinder 108 in order that the tongs may be positioned in substantially the same angular relation to the blank molds and the blow molds. This becomes important in the making of round bottles in order that the seams of the blank molds and blow molds may be at the same position and becomes more important in making non-circular bottles and/or when the machine is provided with plural molds, that is, molds having two or more cavities therein, in which event the tongs will be correspondingly pluralized. As will be seen from a consideration of Fig. 7, the angular relationship of the arm 97 with respect to the blank mold 18 is somewhat different than with respect to the cooperating blow mold, so that if articles are to be located in the same angular relation to both these molds at the ends of their transfer movement therebetween, some means must be provided for accomplishing a relative rotation of the blanks with respect to the arms 97. This is the purpose for which the relative rotation of the cylinders 108 with respect to the arms 97 is provided.

Referring now particularly to Fig. 4 which is an inverted plan view on the line 4—4 of Fig. 2, the lower head 129 of each cylinder 108 is provided with an adjustable stop screw 130 which is adapted to engage a suitable abutment on the arm 97 at one terminal position of the angular movement of the tongs with respect to this arm. A tension spring 131 is provided extending between a bracket 132 secured to the screw 130 and an anchorage 133 on the arm 97, this spring tending to cause the cylinder 108 to assume its furthermost clockwise position (as seen in Fig. 4) with respect to the arm. This is the position it occupies when removing blanks from the blank molds.

When the arm 97 is swung inwardly of the blow mold carrier, an adjustable stop screw 134 in an extension 135 of the head 129 comes into engagement with a fixed stop 136 secured to the turret member 99, thus effecting a rotation of the cylinder 108 with respect to the arm 97 and tensioning the spring 131. Adjustment of stop screws 130 and 134 will thus adjustably predetermine both ends of the relative rotation of the cylinder 108 with respect to its carrying arm 97.

Also, in order that the cam 101 need not be continuous about the whole circumference, I have provided an adjustable stop screw 137 threaded in the arm 97 and adapted to engage an upstanding portion 138 of the bracket member forming the abutment 136. This stop screw 137 thus limits the inward movement of the arm 97 under the action of the spring 106 when the associated cam roller 105 is not in contact with some portion of the cams 101 and/or 103.

*Elongation control means during open air reheat*

Means are provided for mechanically controlling and limiting the elongation of the blanks during a part at least of the time that they are held in the tongs, as above set forth, particularly during the time the blanks are being moved in a path concentric with the blow mold carrier, substantially from the points 91 to 93 of the path as shown in Fig. 7. For this purpose, the supporting plates 139 are provided, as shown best in Fig. 2, these supporting plates being pivoted on horizontal axes as at 140 to vertically slidable carriages 141. The carriages are adapted to be vertically movable each on a pair of guide rods, including the columns 100, extending between the upper and lower portion of the blow mold carrier and parallel columns 142 depending from the blow mold carrier member 99, as illustrated.

Means are provided for controlling the vertical position of the supporting plates 139 to follow the running or elongation of the blanks during reheating, such means comprising cam rollers 143 mounted on the carriages 141 and moving in a closed endless cam slot 144 formed in the outer periphery of a member 145 which is rigid with the center column 5.

Means are also provided for moving each of the supporting plates 139 to and from its operative substantially horizontal position, such means in the present instance comprising a thrust rod 146 having a head 147 adapted to abut against a shoulder on the associated supporting plate 139 as illustrated, the thrust rod 146 being arranged for substantially radial horizontal movement in a guide sleeve 148 rigid or integral with the carriage 141. A tension spring 149 tends at all times to move the thrust rod 146 radially outwardly and thus to move the supporting plate 139 to its operative horizontal position, this spring being connected between a suitable anchorage 150 on the carriage 141 and a head on the inner end of the thrust rod 146. This head also carries a cam roller 151 adapted to be engaged by a stationary cam 152 secured to the stationary column 50 as shown. Suitable means (not shown) may be provided for limiting the upward movement of the supporting plate 139 under the influence of the tension spring 149. Movement thereof in the other direction is controlled by the cam 152 operating to move the cam roller 151 and the thrust rod 146 secured thereto radially inwardly against the tension of the spring 149 and thus to permit the associated supporting plate 139 to drop by gravity about the axis of its pivot 140. It will be understood that the configuration of the cam 152 both vertically and horizontally is so arranged as to compensate for the vertical movement imparted to the carriages 141 by the cam 144 and also to move the supporting plates 139 to and from operative position when desired.

*Blow molds, mounting and operation*

On the blow mold carrier 7 there are, as illustrated, four blow molds, although it is contemplated that any desired number may be placed thereon with suitable changes. The blow molds 153 may be constructed in the usual manner in complementary halves mounted removably in holders 154, as best illustrated in Fig. 3, the holders being pivoted on a common pintle, which in the present instance comprises the vertical columns or shafts 100. The mounting of the blow molds may be considered as substantially conventional.

Means are provided for opening and closing the blow molds when desired, such means in the present instance comprising short links 155 connecting each of the blow mold holders 154 with the outer ends of a V-shaped yoke member 156, which is mounted upon the outer end of a piston rod extending from a pneumatic cylinder 157 secured to the blow mold carrier 7. The outer ends of the yoke member 156 for each blow mold are further formed as guide members 158 and are adapted to ride in suitable parallel guides 159 secured to the blow mold carrier 7, as shown best in Fig. 3. Thus upon movement of the piston within cylinder 157 radially outward of the blow mold carrier, the yoke 156 is correspondingly moved outward along the guides 159 and the blow mold closed through the action of links 155. The angular positions of these links when the blow mold is closed approach a line perpendicular to the direction of movement of the yoke 156 and thus tend to hold the mold closed by a toggle action. This construction is clearly illustrated in Fig. 3.

Pressure may be conducted to the opposite ends of each cylinder 157 from an associated valve 160, this valve being substantially similar to valve 114 above described and being arranged to admit pressure alternately to one end of the cylinder and to exhaust pressure from the other end thereof and vice versa. The particular valve arrangement will be more fully explained in discussing the operation of the machine hereinafter. The valves 160 are of substantially conventional type and are adapted to receive pressure centrally thereof through the passages 161. The valves 160 are controlled by stationary cams 162 secured to the center column 5 of the machine in one direction and are moved in opposite directions by compression springs aligned with the movable member of the valve as illustrated. Pressure may pass from the high pressure line 125 entering the top of the column 5 of the machine downward through the aligned longitudinal bore in the column and a lateral bore 163 to an annular groove formed in the column and thence through pipes illustrated at 164 to the upper valves 165, through which it passes continuously to the passage 161 and thence to the valve 160. The function and operation of the valves 165 will be described hereinafter.

*Blow mold bottom and elongation limiting device associated therewith*

In addition to or in place of the usual bottom plate such as is now in common use, I prefer to provide a device for mechanically controlling the elongation of blanks after they have been enclosed by a blow mold, this device preferably being used in conjunction with a means for gradually expanding the blanks in the blow molds by the use of air at a relatively low pressure, as will be hereinafter described, prior to the expansion of the blanks to the form of the articles to be made by the use of fluid at a relatively higher pressure.

There is mounted on a part of the blow mold carrier beneath and in axial alignment with the blow mold position, a bracket member 166 which removably receives at its upper end an interchangeable annular blow mold bottom member 167, this member having the usual dovetail connection with the blow mold, as best illustrated in Figs. 2 and 12 to 15. The provision of interchangeability for the bottom members 167 provides for the making of articles of different types and/or bottom configurations. Within and preferably axially of the annular member 167 is a vertically movable elongation controlling or limiting device 168, which may also be made interchangeable if desired and which is preferably carried on the upper end of a stem 169 mounted for vertical movement but prevented from rotary movement in a depending sleeve portion 170 of the member 166.

The operation of the member 168 is best illustrated by a comparison of Figs. 12 to 15 inclusive and will be more fully explained hereinafter. For moving the member 168 vertically, I have provided on the lower end of the stem 169 a cam roller 171 adapted to cooperate with a cam 172 (Fig. 2) which is vertically and angularly adjustable and also interchangeable. Provision is made for vertically and angularly adjusting this cam by providing supporting studs 173 therefor, these studs being arranged for vertical adjustment with respect to bosses 174 formed on the base 1, as shown in Fig. 2, and being attachable to the cam 172 by set screws as shown. By providing a cam 172 of the proper configuration and properly adjusting it, the movements of the bottom member 168 may be made to conform to any desired rate of movement or elongation of the blanks. The cam 172 need not be continuous all around the machine, as the lower end of the member 168 may be provided with a shoulder 175, as illustrated, which may seat upon a complementary shoulder formed in the bracket 166 and thus predetermine the lowermost position of the member 168, preferably at the position it is desired to occupy when the blank is blown to final form in the blow mold.

*Final blow head and operating means therefor*

For supplying final blowing pressure to the interior of the blanks in the final blow molds, there is provided a head shown in detail in Fig. 6 and generally indicated at 176. This head is carried by an arm 177 extending laterally from and preferably rigid with a pneumatic cylinder 178 (Fig. 2). The cylinder 178 is mounted for movement with respect to a fixed piston secured to a piston rod 179 depending from the blow mold carrier member 99. Pressure may be supplied to the upper and lower ends of the cylinder 178 through the pipes 180 and 181, these pipes communicating with the pressure passages for supplying pressure to the blow mold opening and closing cylinder 157, as will be more fully hereinafter described.

The cylinder 178 is provided with suitable means (not particularly illustrated) for effecting a rotation with respect to the piston therein and with respect to the piston rod 179 preferably in a manner substantially similar to that illustrated for the rotation of the piston 77 with respect to the cylinder 76, shown in Fig. 5. The arrangement is such that in moving the blow head 176 from its position in cooperation with the blow mold, as shown at the left in Fig. 2, to its inoperative position, the cylinder 178 is first moved vertically without rotation a sufficient distance to free the blow head from the upwardly extending neck portion of the blank or blown article and thereafter the cylinder is moved further and by a single continuous upward movement and simultaneously rotated about the axis of its piston rod to move the head 176 in a substantially helical path to an inoperative position illustrated at the right in Fig. 3. Inasmuch as this construction is substantially conventional, it has not been thought necessary to illustrate it in detail.

Turning now to the particular construction of the head 176, there is provided a floating and relatively vertically movable cup-shaped portion 182 (Fig. 6) to surround the extending neck portion of the blank or finished article in the blow mold, this portion having secured thereto a threaded nipple 183 extending up through an aperture in the end of the arm 177 into the hollow interior thereof as shown. The upper surface of the member 182 is formed convex and cooperates with the complementary concave portion on the underside of the end of the arm 177, so that the member 182 may float freely to seat itself on the blow mold and compensate for minor irregularities in the contour of the upper surface of that mold. The nipple 183 is provided with a bore part way therethrough extending upward from the inside of the cup-shaped portion 184 of the member 182, this portion communicating through lateral bores 185 with the interior cavity at the end of arm 177 when the blow head is positioned on the blow mold. When the blow head is not so positioned, the member 182 will fall by gravity carrying the lateral ports 185 below the hollow portion of the arm 177 and closing the aperture therein, so that pressure is not supplied therethrough during this period. The arm 177 is provided with an axial bore or passage 186 for the supplying of pressure to the head, this passage communicating with the hollow portion or chamber 187 at the end of the arm.

The chamber 187 at the end of arm 177 is closed at its upper end by a threaded member 188 having secured thereto a member forming an exhaust port controlled by a needle valve 189, which may be adjusted to control the bleeding or exhaust of pressure from the chamber 187. Thus the pressure supplied through the blow head 176 may be controlled within certain limits at least by the adjustment of needle valve 189, especially when the pressure supplied through the passage 186 is relatively low. When a relatively high pressure is supplied through passage 186, the needle valve controlled exhaust port is inadequate to vary the pressure to any material extent, so that a relatively high pressure will be supplied to the interior of the glass article in order to complete the final blow.

Turning now to Fig. 2, air or other pressure fluid at a relatively low pressure is supplied through the pipe 190 from any suitable source to a longitudinal bore 191 in the column 5 and passes thence through a lateral bore to an annular groove cut in this column, whence it passes through the pipes 192 to the valves 165, as shown, there being interposed in these pipes check valves 193 preventing reverse flow of pressure for reasons which will presently become apparent. A flexible pipe 194 communicates between the pipe 192 on the downstream side of the check valve 193 and the passage 186 leading to the blow head 176. It will be noted also from the drawings, Figs. 2 and 3, that the high pressure pipe 164 also communicates with the valve 165.

The supplying of pressure to the blow head 176 and the operation of valve 165 is as follows: After a blank has been placed within the blow mold and it is desired to expand the blank gradually by the admission of air at low pressure thereto, the valve 165 is positioned by its cooperating cam, as shown at the right of the center column 5 in Fig. 2, closing the space between the two heads of the valve to low pressure, but passing the high pressure through valve 165 from the pipe 164 to passage 161 and thence to valve 160. Under these circumstances, low pressure air passes from pipe 190 through pipe 192, check valve 193 and flexible pipe 194 to the passage 186 in the arm 177 and thence to the blow head 176 to expand the article gradually, this pressure being controlled by bleeding out a desired portion thereof under control of the needle valve 189 associated with the blow head.

Figure 14:
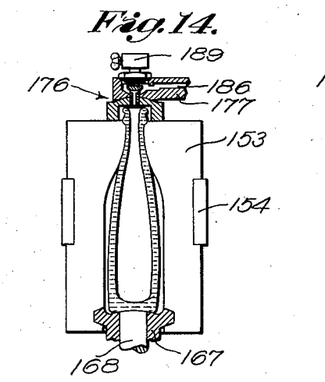

After this expansion has continued for a desired time and substantially to the point shown in Fig. 14 and it is desired to pass high pressure air to the interior of the glass to complete the blowing of the final article, the valve 165 is moved from the position shown at the right of the column 5 in Fig. 2 to that shown at the left of that column in this same figure. Under these circumstances, high pressure air passes from pipe 125 through the longitudinal bore in column 5, thence through the lateral bore 163, the annular groove around the column, the pipe 164 to the interior of valve 165, thence it passes through a part of pipe 192 and through the flexible pipe 194 to the blow head as previously described. High pressure air is prevented from flowing back into the lower pressure supply line by the check valve 193. The adjustment of the bleed valve 189 has little effect upon the pressure supplied to the blow head 176 at this time due to the relatively high pressure of the air being supplied.

Operation of the machine

Having now described the construction of the various instrumentalities of the machine and certain of their operations, I shall describe the operation of the entire machine throughout the complete formation of an article.

Figure 1:
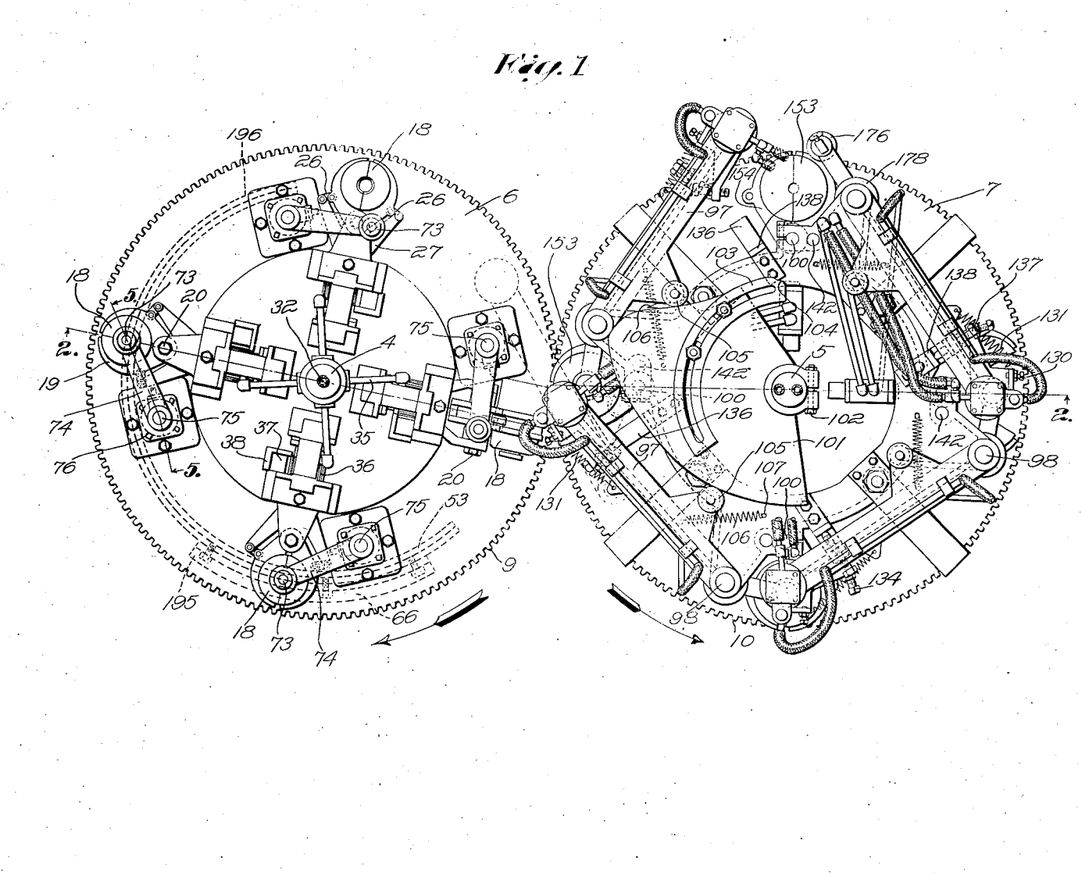
Figure 1 is a plan view of substantially the entire machine, the base and certain other parts being omitted for clarity of illustration.

Charges of molten glass may be supplied in any desired manner to the blank molds of the machine at some desired point, as indicated, for example, by the legends on Fig. 7, although it will be understood that various charging points or zones may be chosen and the operating means adjusted and/or arranged accordingly. At the time a charge is supplied to a blank mold, the mold will be closed and in neck-down position due to pressure being supplied to the radially inner end of the cylinder 23 (Fig. 2), and the inverting cam roller 39 will be riding along a horizontal low portion of the cam track 40. Also at this time, the neck mold 42 will be raised and closed about the lower flanged end of the blank mold, as illustrated at 60 in Figs. 8 and 9, and the neck pin 61 will be raised to the position shown in Fig. 8, these latter operations being controlled by the cam tracks 53 and 66 respectively (see Fig. 1).

After the charge has been supplied to the blank mold, pressure is supplied through the pipe 79 (Fig. 5) from the associated valve to depress the piston 77 in the cylinder 76, thus positioning the settle blow head 73 on the blank mold as shown in Fig. 8. Pressure is then supplied from another of the valves in the block 30 through the pipe 88 and the head 73 to settle blow the charge as shown in Fig. 8 for a desired period of time, at the termination of which the settle blowing pressure is cut off.

The next operation is the withdrawing of the neck pin which is accomplished by relieving the cam track 66, this operation occurring as illustrated (Fig. 1) substantially at the point 195.

Counterblowing pressure may then be supplied through the pipe 72 and passage 70 (Figs. 2 and 9) to counterblow the charge in the blank mold as shown in Fig. 9, this pressure being controlled by one of the valves in the valve block 30.

After the counterblowing has taken place for the desired length of time, the neck ring is opened by exhausting the pressure through the pipe 48 from the cylinder 47, thus allowing the springs 49 to open the neck ring. The neck ring is then lowered due to the associated roller 52 riding down an inclined portion on the cam surface 53. This operation may occur substantially at the zone 196, Fig. 1. The blank mold is now free for inverting movement and the next operation is the inverting of the blank mold carrying the completed blank therein. This is accomplished by the cam roller 39 moving up an inclined portion in the cam track 40, as illustrated in Fig. 2.

At the zone indicated at 90 (Fig. 7), the tongs are moved in substantial coincidence with the path of the neck of the blank which projects above the upper end of the blank mold, and are closed about such neck, due to the exhausting of pressure from the tongs operating mechanism 96 under control of the valve 117, due to the movable member of this valve moving from its outer to its inner radial positions (see Fig. 2). The blank mold is opened at about this time by the admission of pressure to the radial outer end of the cylinder 23 and the exhausting of pressure from the radial inner end of this cylinder. It is contemplated that the closing of the tongs 95 about the neck of the blank may occur either before, during or after the opening of the blank mold, as may be desired, under control of the several cams controlling such movement.

After the blank mold has been opened sufficiently to clear the blank for movement therefrom, pressure is supplied to the lower end of cylinder 108 under the control of the valve 114 thus raising the tongs. Following this movement out of the blank mold, the blank mold may be closed and inverted to a neck-down position for receipt of the next charge, the neck ring thereafter being moved upwardly and closed about the lower end of the blank mold.

The blank is then moved along the path as shown at 89 in dot and dash lines, Fig. 7, which includes a portion of gradually decreasing radius from the axis of the column 5 substantially to the point 91 of that path. The portion of the tong's path from the point 91 to the point 93 is substantially at a constant radius, this radius being somewhat less than the radius of the centers of the blow molds.

After the blank has reached this inner radius, the supporting plate 139 may be moved upwardly into its operative position beneath the blank by the cam 152 being relieved and the spring 149 moving the supporting plate into the horizontal position. Alternatively, this supporting plate may previously be in this position and the blank moved over it as may be desired. In any event, the blank begins to elongate as soon as it is removed from the blank mold, at first very slowly and then progressively faster and soon reaches a point to be supported by the supporting plate 139, as shown in Fig. 10.

Figure 10:
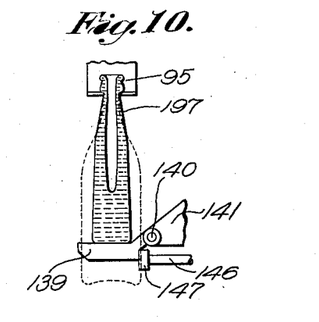
Figures 11, 12, 13:
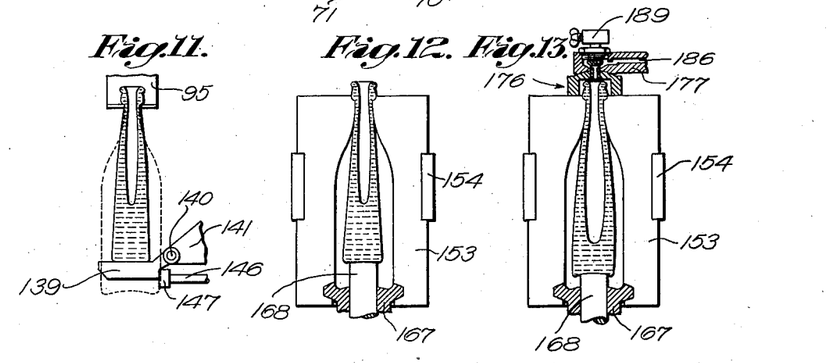

The configuration of the blank mold is preferably such that the neck portion of the blank is somewhat larger than the corresponding portion of the desired articles as is illustrated by the full line showing of the blank 197, Fig. 10, on which figure and Fig. 11 are superimposed dotted outlines showing the configuration of the desired article, these showings being for purposes of comparison. This subject matter is more fully described and claimed in my copending application, Serial No. 716,634 above referred to.

The bottom of the blank being supported on the supporting plate 139, this plate is gradually moved downwardly to control and limit the elongation of the blank while being moved through the path as illustrated at 89 by the tongs, the blank developing as will be seen by a comparison of Figs. 10 and 11.

At or shortly prior to the arrival of the blank at the point 93 in its path, as shown in Fig. 7, the supporting plate 139 is withdrawn from under the blank due to the action of the cam 152 on the cam roller 151, thus freeing the bottom of the blank and the blank as a whole for movement into the blow mold, which has now been opened and the prior article removed therefrom in readiness for the reception of the blank being considered.

The tongs are now moved outwardly by a relatively short, quick movement which imparts a radial outward movement to the neck end of the blank resulting in a force about the center of gravity thereof which tends to counteract the effect of centrifugal force acting on the blank during the movement thereof in the tongs up to this time.

The blank is now lowered into registry with the blow mold substantially at the zone 94, the tongs following the path of such mold up to a point 92 (Fig. 7). During this period the blow mold is closed about the blank, as shown in Fig. 12, this operation being effected by the admission of pressure to the radially inner end of cylinder 157. Substantially simultaneously with or possibly just before or just after the closing of the blow mold, the tongs are opened by the admission of pressure to the pipe 123 from the valve 117. The tongs are now free for their return movement to grasp the next succeeding article and are moved by the means heretofore described to a proper position to grasp such article.

When the blow mold is closed about the blank, the movable bottom portion 168 thereof is at its uppermost position and under the control of the cam 172, as shown in Figs. 2 and 12. This movable portion is thereafter gradually moved downwardly, as will be seen from a comparison of Figs. 12, 13 and 14.

It may be desired at this time to supply blowing pressure to the interior of the blank during the downward movement of the member 168, this blowing pressure preferably being supplied at a relatively low pressure under control of the needle valve 189 shown in Fig. 6.

Figure 15:
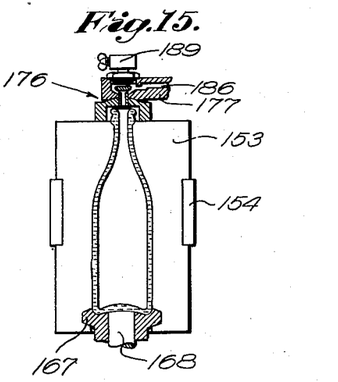

In any event, the head 176 is moved downwardly to engage about the upper end of the article, as shown in Figs. 13, 14 and 15, by the same air which closed the blow mold. This air which is admitted by the valve 160 to the radially inner end of cylinder 157 through the passage 198 and bore 199, as seen in Fig. 2, also passes through the bore 200 and a circumferential groove in the piston rod associated with the cylinder 157, as shown at the left of the vertical column 5 of Fig. 2, to the passage 181 and thence to cylinder 178. It will be noted, however, that no pressure can pass to cylinder 178 to lower the blow head 176 to its operative position on the blow mold prior to the complete closing of the blow mold, due to the fact that the circumferential groove in the piston rod of the blow mold closing cylinder is not aligned with the two portions of the bore 200 prior to this time. Reverse movement of these two cylinders, that is the raising of the blow head and the opening of the blow mold may take place substantially simultaneously as pressure is admitted to the radial outer end of the blow mold and to the pipe 180 simultaneously from the valve 160.

The lower pressure air is supplied, as heretofore described, by movement of the movable member or valve 165 to the position seen at the right of the vertical column 5 in Fig. 2 and the glass expanded from the form shown in Fig. 12 through the forms shown in Fig. 13 substantially to that shown in Fig. 14. Thereafter high pressure may be supplied to complete the final blowing of the article, as shown in Fig. 15, by movement of the piston or movable member of valve 165 to the position seen at the left of the vertical column 5 in Fig. 2 and in a manner heretofore described.

It will be seen that the opening of the blow mold for the release of a completed article need take place only just prior to the placing of the next succeeding article therein, so that the blow mold is in operation substantially its entire time. The blank mold also is in operation as illustrated for perhaps three-quarters of its entire time.

If, for example, charges of glass are supplied to the blank molds at the point A in Fig. 7, then the charge of glass which was previously supplied to and formed into a blank in the same blank mold will be supported in the tongs at the point B in that figure and the charge of glass which was still earlier supplied to the same blank mold and formed into a blank therein and thereafter supported in the same tongs for reheating will be in the blow mold at the point C, substantially beneath the position of the tongs at point B. Thus there will be an overlapping time relationship between the formation of successive articles, all of which were formed into blanks in the same blank mold, in which a charge of glass will be in the blank mold simultaneously with the supporting of the preceding charge of glass which was supplied to that same blank mold in the tongs, and further simultaneously with the enclosing of a still earlier formed charge of glass, formed into a blank in the same blank mold, in a final blow mold. This may be termed a "triple overlapping cycle" for the machine; that is, three charges of glass all supplied with the same blank mold are in various stages of formation at the same time during each complete cycle of the machine as measured by the time interval between the supplying of successive charges of glass to successively charged blank molds on the machine.

Although I have only shown one mechanical embodiment of my machine and one means by which the methods hereinafter claimed may be carried out, it will be obvious to those skilled in the art that many changes may be made therein, both in the mechanism and in the method, without departing from the spirit of this invention and also that various of the instrumentalities and sub-combinations thereof are susceptible of independent utility. I do not wish to be limited, therefore, except by the scope of the appended claims, which are to be construed as broadly as the state of the prior art permits.

I claim:
1. Apparatus for forming hollow glass articles, comprising laterally spaced rotary carriers, means for rotating said carriers in synchronism, a blank mold on one of said carriers, a blow mold on the other of said carriers, means for forming a charge of plastic glass supplied to said blank mold into a blank therein, transfer means carried by and rotating with the blow mold carrier for transferring a blank formed in said blank mold to said blow mold, means for causing said transfer means to engage and remove a blank from said blank mold, means for causing said transfer means to support a blank thus removed from said blank mold and to move it through a path out of registry and out of contact with either said blank mold or said blow mold for a period of time during which said carriers are rotated through at least a quarter of a revolution to permit the reheating of the blank while so supported and during which a glass article previously transferred to said blow mold remains therein, means for thereafter causing the transfer means to position the blank so that it may be enclosed by said blow mold, means to cause said blow mold to close about the blank as thus positioned, and means for blowing the blank to final form in said blow mold.

2. Apparatus for forming hollow glass articles, comprising laterally spaced rotary carriers, means for rotating said carriers in synchronism, a blank mold on one of said carriers, a blow mold on the other of said carriers, means for forming a charge of plastic glass supplied to said blank mold into a blank therein, transfer means carried by and rotating with the blow mold carrier for transferring a blank formed in said blank mold to said blow mold, means for causing said transfer means to engage and remove a blank from said blank mold, means for causing said transfer means to support a blank thus removed from said blank mold and to move it through a path out of registry and out of contact with either said blank mold or said blow mold and for a period of time during which said carriers are rotated through a material part of a revolution to permit the reheating of the blank while so supported, the position of the blank during the latter part of its rotation about the axis of the blow mold carrier and during the reheating as aforesaid being at a less radius from the axis of rotation of the blow mold carrier than the axis of the blow mold, means for thereafter causing the transfer means to position the blank coaxially with the axis of the blow mold by a movement substantially radially outward of the blow mold carrier and thereby to exert a force on the blank tending to counteract the effect of centrifugal force exerted thereon due to the rotation of the blank about the axis of the blow mold carrier, means to close said blow mold about the blank as thus positioned, and means for blowing the blank to final form in said blow mold.

3. Apparatus for forming hollow glass articles, comprising laterally spaced rotary carriers, means for rotating said carriers in synchronism, a blank mold on one of said carriers, a blow mold on the other of said carriers, means for forming a charge of plastic glass supplied to said blank mold into a blank therein, transfer tongs mounted on and rotatable with the blow mold carrier and arranged for horizontal movement with respect thereto in a direction having a substantial component at least radial of the blow mold carrier, cam means with respect to which the blow mold carrier and the transfer tongs are rotatable for moving the tongs horizontally, means for causing said transfer tongs to engage and remove a blank from said blank mold, means including said cam for causing said tongs to support a blank for reheating at a less radius from the axis of the blow mold carrier than the axis of said blow mold and at a position out of registry with said blow mold, said cam being formed with a sector arranged to move said tongs outwardly of the blow mold carrier to position the blank so that it may be enclosed by said blow mold and to provide a force effective on the blank tending to counteract the effect of centrifugal force thereon due to the rotation of the blow mold carrier, means to cause said blow mold to close about the blank as thus positioned, and means for blowing the blank to final form in said blow mold.

4. Apparatus for forming hollow glass articles, comprising laterally spaced rotary carriers, means for rotating said carriers in synchronism, a blank mold on one of said carriers, a blow mold on the other of said carriers, means for forming a charge of plastic glass supplied to said blank mold into a blank therein, transfer means carried by and rotatable with the blow mold carrier for transferring a blank formed in said blank mold to said blow mold, means for causing said transfer means to engage and remove a blank from said blank mold, means for causing said transfer means to support a blank thus removed from said blank mold and to move it through a path having a material portion substantially concentric with the path of said blow mold but out of registry and out of contact therewith for reheating the blank, a bottom plate cooperable with the blank while supported by said transfer means during a portion at least of the concentric travel of the blank as aforesaid, means for moving said bottom plate vertically to control the elongation of the blank during their cooperative travel, means for thereafter causing the transfer means to position the blank supported thereby so that it may be enclosed by said blow mold, means for closing said blow mold about the blank as thus positioned, means for blowing the blank to final form in said blow mold, and means for timing all the aforesaid means to cause said transfer means to support a blank for reheating as aforesaid for a material time period prior to the opening of the associated blow mold for the release of the preceding glass article formed therein.

5. Apparatus for forming hollow glass articles, comprising laterally spaced rotary carriers, means for rotating said carriers continuously in synchronism with each other, a blank mold on one of said carriers, a blow mold on the other of said carriers, means for forming a charge of plastic glass supplied to said blank mold into a blank therein, transfer means carried by and rotatable with the blow mold carrier for transferring a blank formed in said blank mold to said blow mold during the continuous rotation of said carriers, means for causing said transfer means to engage and remove a blank from said blank mold, means for causing said transfer means to support a blank thus removed from said blank mold and to move it through a path having a material portion substantially concentric with the blow mold carrier but out of registry and out of contact with said blow mold for reheating the blank, a bottom plate carried by said blow mold carrier and movable to a position beneath a blank during the concentric travel thereof while supported in said transfer means as aforesaid, means operable by the rotation of the carriers for positioning the bottom plate in cooperative relation with a blank, other means operable by the rotation of said carriers for vertically moving the bottom plate during its cooperative travel with a blank for controlling the elongation of such blank during the cooperative travel thereof with the bottom plate, means for thereafter moving said bottom plate to an inoperative position, means for moving the transfer means to position the blank so that it may be enclosed by said blow mold, means for closing the blow mold therearound, means for blowing the blank to final form in said blow mold, and means for timing the operation of all the aforesaid means to cause the opening of said blow mold for the release of a completed article therefrom subsequent to at least a part of the concentric travel of the next succeeding article to be transferred to said blow mold by said transfer means for reheating as aforesaid.

6. Apparatus for forming hollow glass articles, comprising laterally spaced rotary carriers, means for rotating said carriers continuously and in synchronism, a plurality of blank molds on one of said carriers, a plurality of blow molds on the other of said carriers, means cooperating with said blank molds for forming charges of plastic glass supplied thereto into blanks therein, a transfer arm individual to each of said blow molds and pivoted on a vertical axis rotating therewith, tongs on each of said transfer arms, means for opening and closing said tongs, cam means for moving each of said transfer arms about their vertical axes and constructed and arranged to cause the tongs substantially to follow the path of a blank mold throughout an arcuate course sufficient for the tongs to grasp an article and remove it from a blank mold, said cam means being constructed and arranged thereafter to move said transfer arms and the tongs thereon inwardly of the blow mold carrier a distance unequal to the distance required to move the parisons into radial alignment with the blow molds to a reheating position out of registry and out of contact with the blow molds, whereby a blank may be reheating in one of the tongs and the corresponding blow mold utilized simultaneously for the forming of another glass article, said cam means being constructed and arranged thereafter to cause said transfer arms to position blanks held in the tongs thereof so that they may be enclosed by the corresponding blow molds respectively, means for closing the blow molds about the blanks, and means for blowing the blanks to final form in the blow molds.

7. Apparatus for forming hollow glass articles, comprising laterally spaced rotary carriers, means for rotating said carriers continuously and in synchronism, a plurality of blank molds on one of said carriers, a plurality of blow molds on the other of said carriers, means for forming charges of plastic glass supplied to said blank molds into blanks during the rotation of the blank mold carrier, transfer arms individual to each of said blow molds and each mounted on a vertical axis on and eccentric of the axis of rotation of the blow mold carrier, tongs on each of said transfer arms at a point remote from their vertical axis pivots, means for opening and closing said tongs, cam means operating as a result of the rotation of the blow mold carrier for rotating said transfer arms about their vertical axis pivots, means for moving said tongs vertically operable in response to the rotation of the blow mold carrier, bottom plates for controlling the elongation of parisons held in the tongs at a position with respect to the blow mold carrier out of registry with the corresponding blow molds, means operated as a result of the rotation of the blow mold carrier for moving said bottom plates to and from operative position, other means operated as a result of the rotation of the blow mold carrier for moving said bottom plates vertically, means for opening and closing said blow molds, and means for blowing blanks to final form in said blow molds.

8. Apparatus for forming hollow glass articles, comprising laterally spaced rotary carriers, means for rotating said carriers in synchronism, a blank mold on one of said carriers, a blow mold on the other of said carriers, means for forming a charge of plastic glass supplied to said blank mold into a blank therein, transfer means carried by and rotatable with the blow mold carrier for transferring a blank formed in said blank mold to said blow mold, means for causing said transfer means to engage and remove a blank from said blank mold, means for causing said transfer means to support the blank thus removed from said blank mold and to move it through a path out of registry and out of contact with either said blank mold or said blow mold for a material length of time to permit the reheating of the blank while so supported, means for thereafter causing the transfer means to position the blank so that it may be enclosed by said blow mold, means to close said blow mold about the blank as thus positioned, means for blowing the blank to final form in said blow mold, and means for timing the operations of all the aforesaid means so constructed and arranged that two charges of glass are simultaneously in the process of formation as follows: one having been supplied to said blank mold and being enclosed thereby, and the second, which was previously supplied to and formed into a blank in the same blank mold, being supported by said transfer means for reheating out of registry with either said blank or blow molds as aforesaid.

9. Apparatus for forming hollow glass articles, comprising laterally spaced rotary carriers, means for rotating said carriers in synchronism, a blank mold on one of said carriers, a blow mold on the other of said carriers, means for forming a charge of plastic glass supplied to said blank mold into a blank therein, transfer means carried by and rotatable with the blow mold carrier for transferring a blank formed in said blank mold to said blow mold, means for causing said transfer means to engage and remove a blank from said blank mold, means for causing said transfer means to support the blank thus removed from said blank mold and to move it through a path out of registry and out of contact with either said blank mold or said blow mold for a material length of time to permit the reheating of the blank while so supported, means for thereafter causing the transfer means to position the blank so that it may be enclosed by said blow mold, means to close said blow mold about the blank as thus positioned, means for blowing the blank to final form in said blow mold, and means for timing the operations of all the aforesaid means so constructed and arranged that three charges of glass will be simultaneously in the process of formation as follows: the first having been supplied to said blank mold and being enclosed thereby, the second, which was formed into a blank in the same blank mold, being supported by said transfer means for reheating out of registry with the blank and blow molds as aforesaid, and the third, which was still earlier formed into a blank in the same blank mold, being enclosed by said blow mold.

10. Apparatus for forming hollow glass articles, comprising laterally spaced rotary carriers, means for rotating said carriers continuously in synchronism, blank molds on one of said carriers, blow molds on the other of said carriers, means for forming charges of plastic glass supplied to said blank molds into blanks therein, transfer means individual to said blow molds and carried by and rotating with the blow mold carrier for transferring blanks formed in said blank molds to said blow molds, means for causing the transfer means to engage and remove blanks from the blank molds, means for causing the transfer means to support blanks thus removed from the blank molds and to move them through a path out of registry and out of contact with either said blank molds or said blow molds and each for a period of time during which the carriers are rotated through a material part of a revolution of the blow mold carrier to permit the reheating of the blanks while so supported, means for thereafter causing the transfer means to position the banks so that they may be enclosed by the respective blow molds, means to close the blow molds successively about the blanks as thus positioned, means for blowing the blanks to final form in the blow molds, and means for timing of the operations of all the aforesaid means so constructed and arranged that two charges of glass will be simultaneously in the process of formation for each of said blank molds during each cycle of operation of the machine as measured by the time interval between the supplying of successive charges of glass to said blank molds, one having been supplied to a blank mold and being enclosed thereby and the other, which was formed into a blank in the same blank mold, being supported by one of the transfer means for reheating out of registry with the blank and blow molds as aforesaid.

11. Apparatus for forming hollow glass articles, comprising laterally spaced rotary carriers, means for rotating said carriers continuously in synchronism, blank molds on one of said carriers, blow molds on the other of said carriers, means for forming charges of plastic glass supplied to said blank molds into blanks therein, transfer means individual to said blow molds and carried by and rotating with the blow mold carrier for transferring blanks formed in said blank molds to said blow molds, means for causing the transfer means to engage and remove blanks from the blank molds, means for causing the transfer means to support blanks thus removed from the blank molds and to move them through a path out of registry and out of contact with either said blank molds or said blow molds and each for a period of time during which the carriers are rotated through a material part of a revolution to permit the reheating of the blanks while so supported, means for thereafter causing the transfer means to position the blanks so that they may be enclosed by the respective blow molds, means to close the blow molds successively about the blanks as thus positioned, means for blowing the blanks to final form in the blow molds, and timing means for controlling the operations of all the aforesaid means so constructed and arranged that during each cycle of the machine as measured by the time interval between the supplying of successive charges of glass to said blank molds, three charges of glass will be simultaneously in the process of formation as follows: one having been supplied to one of said blank molds and being enclosed thereby, a second, which was formed into a blank in the same blank mold, being supported by one of said transfer means out of registry with either said blank or blow molds as aforesaid, and a third, which was still earlier formed into a blank in the same blank mold, being enclosed within the final blow mold cooperating with the transfer means supporting the second of said blanks.

12. The method of forming hollow glass articles, which comprises the steps of forming a blank, removing the blank from the blank mold and supporting it in tongs for a period of time desired for the reheating of the blank, moving the tongs in a path such as to support the blank out of contact and out of registry with any mold during such reheating, controlling the elongation of the blank during a portion at least of such reheating, transferring the blank to a blow mold, mechanically controlling the elongation of the blank in the blow mold, and blowing the blank to final form in the blow mold first by the application of a fluid at a relatively low pressure and thereafter by the application of a fluid at a relatively high pressure.

13. The method of forming hollow glass articles, which comprises the steps of forming a blank in a blank mold from a charge of molten glass while moving it through a substantially circular path, lifting the blank thus formed out of the blank mold by tongs movable in an orbital path about a center spaced laterally from the center of the blank mold path, moving the blank in said orbital path during a material period of time for reheating the blank while supporting it out of registry with any mold, mechanically limiting and controlling the elongation of the blank during a portion at least of such reheating period, transferring the blank to and enclosing it by a blow mold, mechanically controlling the elongation of the blank while the blank is continuing its reheating in the blow mold, and expanding the blank to final form in the blow mold.

14. The method of forming hollow glass articles, which comprises the steps of forming a blank in a blank mold from a charge of glass while continuously moving it through a substantially circular path about a vertical axis, lifting the blank thus formed out of the blank mold by tongs movable in an orbital path about a second vertical axis spaced laterally from the axis of the blank mold path, moving the blank in such orbital path during a material period of time for reheating the blank while supporting it out of registry with any body mold surface, mechanically controlling and limiting the elongation of the blank during a portion at least of such reheating period, transferring the blank to and enclosing it by a blow mold moving continuously in a substantially circular path about the second named vertical axis, mechanically controlling the elongation of the blank in the blow mold while the blank is continuing its reheating, during such continuance of the reheating expanding the blank gradually toward the shape of the final blow mold by the application of fluid to the interior thereof at a relatively low pressure, and completing the expansion of the blank to the form of the final desired article by the application to the interior thereof of fluid at a relatively high pressure.

15. The method of forming hollow glass articles, which comprises the steps of forming a blank in a blank mold, removing the blank from the blank mold and supporting it in tongs for reheating and while moving it through a path at least a portion of which is substantially circular about a vertical axis at a predetermined radius, moving the blank while still supported as aforesaid to a position to be enclosed by a blow mold at a somewhat greater radius by a movement so calculated as to exert a force on the blank tending to counteract the effect of centrifugal force thereon due to its movement in the circular path as aforesaid, enclosing the blank in the blow mold which embraces the neck portion thereof, substantially simultaneously supporting the lower end of the blank upon a vertically movable bottom member associated with the blow mold so as to prevent distortion of the blank under the action of centrifugal force during its elongation within the blow mold, expanding and elongating the blank gradually by the application of a relatively low pressure to the interior thereof until it is substantially the length of the blow mold, and completing the expansion of the glass within the blow mold to form the desired article by the application of a relatively high pressure to the interior of the glass therein.

16. The method of forming hollow glass articles, which comprises the steps of forming a blank in a blank mold from a charge of molten glass by first settle blowing and then counterblowing the charge while moving it continuously through a portion of a substantially circular path, reverting the glass from a neck-down to a neck-up position while enclosed by the blank mold, lifting the blank thus formed out of the blank mold by tongs movable in a predetermined orbital path about a center spaced laterally from the center of the first named circular path, moving the blank while held by the tongs for reheating through such orbital path during a material period of time while supporting the blank out of registry with any body mold, a material portion of the path of the tongs while supporting a blank being substantially circular about the second named axis and at a predetermined radius therefrom, mechanically controlling the elongation of the blank while supported in the tongs for reheating during the circular portion of the path of the tongs, moving the blank while still held in the tongs to a position at a greater radius from the second named axis by a movement calculated to exert a force on the blank tending to counteract the force exerted thereon by centrifugal force during the reheating in the tongs, enclosing the blank within a blow mold moving in a substantially circular path at the outer radius position to which the blank has been moved and supporting it by its neck within such blow mold, supporting the lower portion of the blank after the blow mold has been closed thereabout and controlling its elongation mechanically while in the blow mold, and expanding the blank to final form within the blow mold by a single continuous blow including first an application of fluid at a relatively low pressure during the expansion of the blank within the blow mold and the controlled elongation thereof and thereafter by the application of fluid at a relatively high pressure to blow the glass to the form of the final desired article within the blow mold.

17. The method of forming hollow glass articles, which comprises the steps of forming a blank in a blank mold from a charge of molten glass while moving it through a portion of a substantially circular path, removing the blank thus formed from the blank mold by tongs movable in an orbital path about an axis spaced laterally from the axis of the blank mold path, moving the blank in such orbital path during a material period of time for reheating the blank while supporting it out of registry with any mold, transferring the blank to and enclosing it by a blow mold, expanding the blank in the blow mold to final form, and so timing the various operations that two charges of glass may be simultaneously in the process of formation as follows: one having been supplied to the blank mold and being enclosed thereby and a second, which was previously formed into a blank in the same blank mold, being supported by said tongs out of registry with any mold as aforesaid.

18. The method of forming hollow glass articles, which comprises the steps of forming a blank in a blank mold from a charge of molten glass while moving it through a portion of a substantially circular path, removing the blank thus formed from the blank mold by tongs movable in an orbital path about an axis spaced laterally from the axis of the blank mold path, moving the blank in such orbital path during a material period of time for reheating the blank while supporting it out of registry with any mold, transferring the blank to and enclosing it by a blow mold, expanding the blank in the blow mold to final form, and so timing the various operations that at one time three charges of glass may be simultaneously in the process of formation as follows: one having been supplied to the blank mold and being enclosed thereby, a second, which was formed into a blank in the same blank mold, being supported by the tongs for reheating out of registry with any mold, and the third, which was still earlier formed into a blank in the same blank mold and thereafter reheated in the same tongs as aforesaid, being enclosed by the blow mold.

GEORGE E. HOWARD.